United States Patent [19]

Dehar

[11] 4,135,745

[45] Jan. 23, 1979

[54] QUICK CONNECT FLUID FITTING

[75] Inventor: David C. Dehar, Dearborn Heights, Mich.

[73] Assignee: Ford Motor Company, Dearborn, Mich.

[21] Appl. No.: 864,077

[22] Filed: Dec. 23, 1977

[51] Int. Cl.² .................................... F16L 21/00
[52] U.S. Cl. .................................... 285/319; 285/356; 285/DIG. 22; 285/DIG.25
[58] Field of Search ............. 285/DIG. 25, DIG. 22, 285/319, 356, 357

[56] References Cited

U.S. PATENT DOCUMENTS

| | | | |
|---|---|---|---|
| 3,711,125 | 1/1973 | Dehar | 285/319 X |
| 3,826,523 | 7/1974 | Eschbaugh | 285/DIG. 25 X |
| 3,847,421 | 11/1974 | Eschbaugh et al. | 285/DIG. 25 X |
| 3,929,357 | 12/1975 | DeVincent et al. | 285/DIG. 25 X |
| 3,997,196 | 12/1976 | Karcher et al. | 285/319 X |
| 4,035,005 | 7/1977 | DeVincent et al. | 285/DIG. 25 X |
| 4,063,760 | 12/1977 | Moreiras | 285/DIG. 22 X |

FOREIGN PATENT DOCUMENTS 781227  2/1935  France ..................... 285/356

Primary Examiner—Thomas F. Callaghan
Attorney, Agent, or Firm—Donald J. Harrington; Keith L. Zerschling

[57] ABSTRACT

A fluid fitting for attaching fluid conduits to a housing which makes possible a simplified assembly procedure that requires only the insertion of a tube assembly into a preassembled nut located in a threaded opening in the housing. The assembly includes an expandable clip located on the tube between retainer beads formed on the tube. The clip contains locking fingers that engage a shoulder on the nut.

4 Claims, 6 Drawing Figures

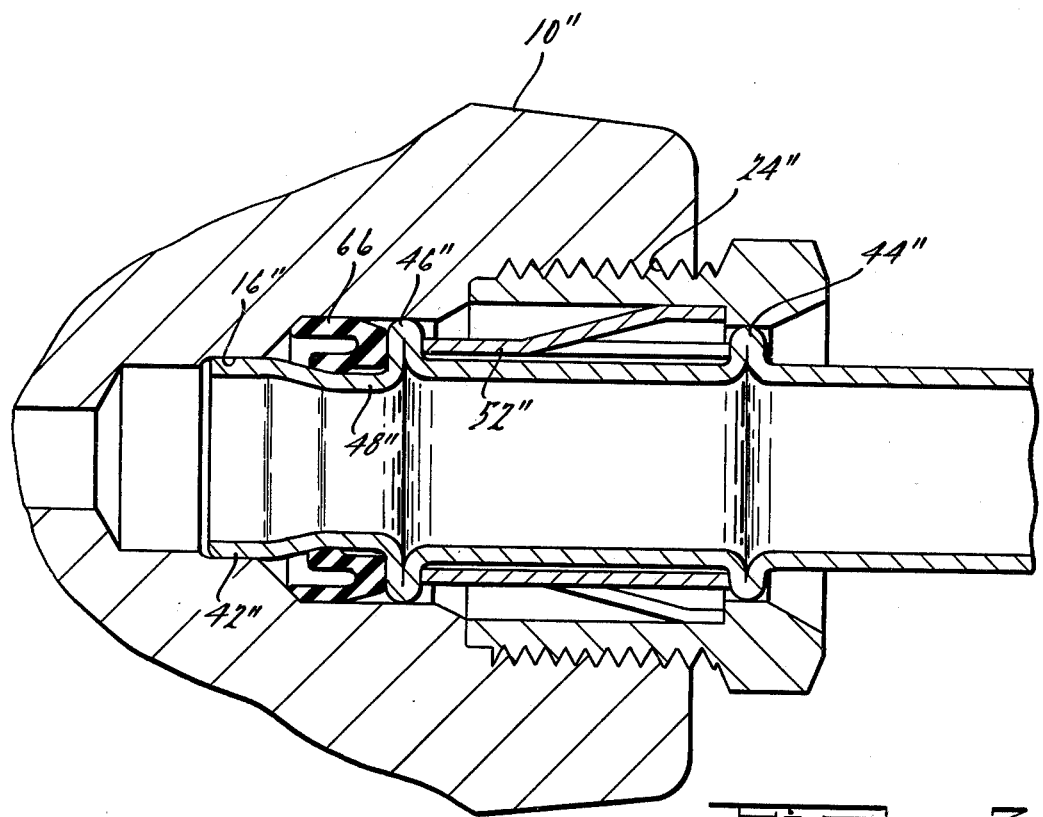
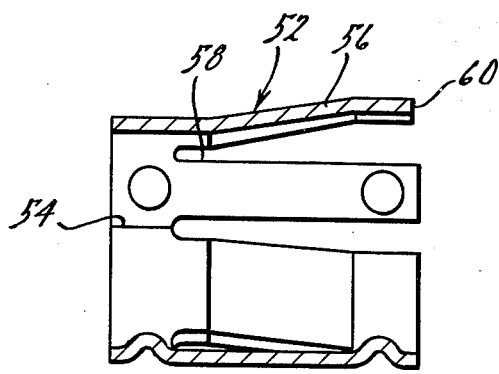
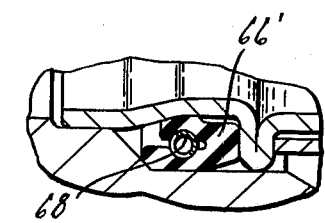
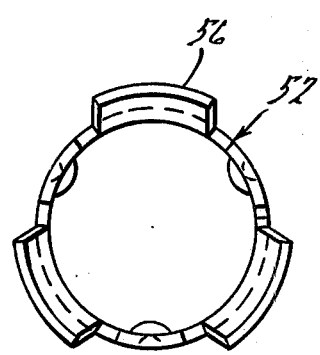

QUICK CONNECT FLUID FITTING

GENERAL DESCRIPTION OF THE INVENTION

My invention is an improvement in the quick-connect fitting shown in my U.S. Pat. No. 3,711,125 and in prior art patents U.S. Pat. Nos. 3,826,523 and 3,933,378. It is adapted especially for use in connecting transmission oil cooler lines to the transmission housing of an automatic transmission for a vehicle. It is adapted also for use in connecting power steering pressure lines to the housing of a power steering gear in an automotive vehicle and for connecting refrigent lines to various elements of an automotive air conditioning system.

Leakage problems are common in certain prior art systems that require a conventional threaded nut that must be torqued during assembly. Cross threading and fitting damage during assembly cause leakage. Also, torque variations occur in a high production assembly operation due to differences in the techniques of the assembler. My improved quick-connect fitting makes possible an assembly of a pressure tube to a transmission oil cooler, a power steering gear or an air conditioning component by a simple, one-hand operation without special tools. It requires only a simple tube-push motion to effect a positive, fluid-tight seal with improved reliability.

My quick-connect fitting includes a tube end portion with spaced annular ribs or beads between which is located a clip with expandable ends or fingers that protrude in a radially outward direction. A nut is threaded into the opening in the housing to which the fluid conduit is to be attached. The nut is formed with an internal shoulder, and it is threaded into place prior to the assembly operation. A shoulder in the housing is engaged by the ends of the nut. When the nut is threaded and torqued into space, no special machining operation is required during formation for the housing opening that receives the fitting.

The spaced beads on the tube retain the clip and resist sliding of the clip. The beads form pilot shoulders, one of which engages the internal surface of the opening of the housing and the other of which engages the internal surface of the preassembled nut so that the tube is stable once it is assembled.

The clip is preassembled on the tube by expanding it over the tube and locating it between the two beads. The tubing may be shipped to the final assembly operation with an overring or lip seal located on it as well as the preassembled clip. The nut is preassembled to the housing of the transmission oil cooler, power steering housing or air conditioning component; and during the final assembly operation the tube is inserted into the nut until the tube bottoms in the bore in the housing and the fingers on the clips snap into the nut and engage the internal shoulder on the nut. The beads at that time retain the clip from sliding on the tube and stabilize the fitting, as mentioned previously, and they also serve as a visual aid to determine when the tube has properly been assembled. When the clip is engaged to disassemble the tube, the nut is removed; and the tube is then free to back out of the bore. To reassemble, the nut is threaded back into the cavity in the housing along with the clip and the tube. The clip may be readily removed for replacement or repair merely by sliding the nut away from the clip. Once the clip is removed, the nut may be removed from the tubing and then reinserted into the threaded opening. The tube then may be reassembled with a new clip by inserting the tube into the opening of the nut as previously described.

BRIEF DESCRIPTION OF THE FIGURES OF THE DRAWINGS

FIG. 3 is a second alternate construction embodying the features of my invention.

FIG. 3A is a partial cross-sectional view of a coupling assembly using an alternate seal at its innermost end.

FIG. 4 is a cross-sectional view of the clip adapted to be used in the assembly of FIGS. 1 and 3.

FIG. 5 is an end view of the clip of FIG. 4.

PARTICULAR DESCRIPTION OF THE INVENTION

Figure 1:
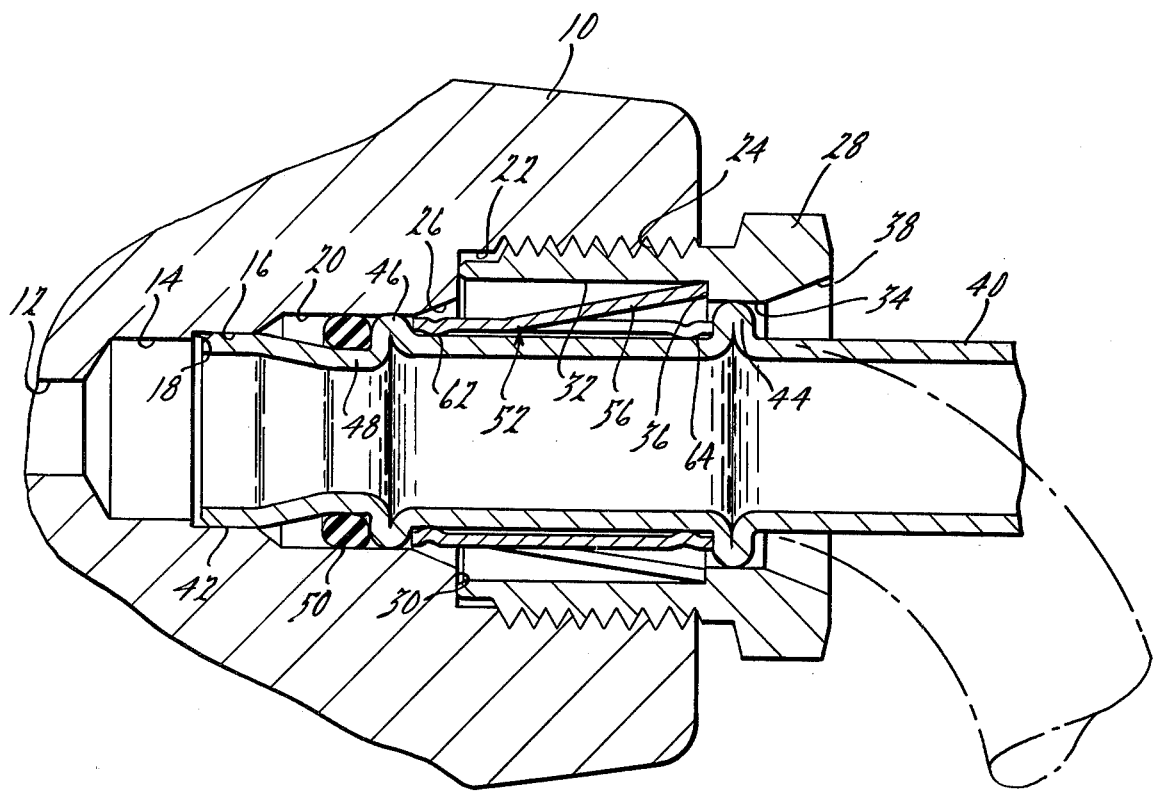
FIG. 1 shows a cross-sectional view of a fitting assembly embodying the features of my invention.

In FIG. 1 numeral 10 designates a housing for a transmission oil cooler, or a power steering gear, or an air conditioning component or the like. It includes a pressure passage 12 which extends to the exterior of the housing. Passage 12 includes stepped diameter portions 14 and 16 which form an annular shoulder 18 therebetween. Passage portion 20 is situated adjacent portion 16 and is formed with a diameter larger than the diameter of passage portion 16. A large diameter portion 22 of the passage 12 is formed with an internal thread 24. Preferably the transition zone between the portion 20 and the portion 22 is tapered as shown at 26. A nut 28 is threaded into the threaded portion 22 of the passage 12. It is adapted to engage a shoulder stop 30 located at the end of the portion 22.

Nut 28 is formed with a cylindrical opening 32 which has a reduced diameter portion 34. An annular shoulder 36 is defined by the reduced diameter portion 34. The outermost end of the opening 32 is flared as shown at 38.

A pressure tube 40 is shown assembled inside the nut 28. It is provided with a cylindrical pilot portion 42 located at its left end as seen in FIG. 1. The tube is adapted to be inserted in the passage 12 in the housing 10 until it engages the shoulder stop 18.

Tube 40 is provided with a pair of spaced annular shoulders or beads 44 and 46. Bead 46 is located adjacent a reduced diameter portion 48, which defines a groove for retaining an O-ring seal 50. Seal 50 sealingly engages the internal cylindrical surface of the passage portion 20 when the tube 40 is assembled as shown in FIG. 1.

Located between the beads 44 and 46 is a circular retainer clip 52, which is best seen in FIG. 4 and 5. The clip 52 is split along a parting line 54 to allow it to be expanded over the tube 40 during assembly. Clip 52 is generally cylindrical and its ends are adapted to be engaged by the beads 46 and 44. The clip 52 is provided with a plurality of radially extending fingers 56 preferably three in number. These fingers are defined by longitudinally extending slots 58 formed in the clip 52. The ends 60 of the fingers 56 are adapted to engage the annular shoulder 36 on the nut 28 when the tube is assembled as shown in FIG. 1.

The tube 40 is shipped to the final assembly operation with the O-ring 50 and the clip preassembled. Prior to final assembly the nut 28 is threaded into place. During the final assembly operation, the tube is inserted into the nut until the tube bottoms against the shoulder 18 and the clip fingers 56 snap into place within the nut with the ends 60 engageable with the shoulder 36. When the tube is assembled as shown, the bead 44 is piloted within the cylindrical surface of the reduced diameter portion 34; and the bead 46 is piloted within the surface of the passage portion 20. This stabilizes the tube after it is assembled. When the tube is fully inserted, the O-ring seal 50 sealingly engages the surrounding cylindrical sealing surface of the larger diameter portion 20.

To disassemble the fitting the nut is removed, thereby allowing the tube to be backed out of the bore. The clip remains in place by the beads 44 and 46 during the assembly and disassembly operation.

The clip 50 may be formed with spaced dimples 62 and 64 to assist in assembling the clip over the O rings during the preassembly operation if this is desired. During disassembly the fitting can be either reassembled as a unit after the nut is backed out of the threaded opening or by removing the clip and the nut and reassembling the entire assembly with the push-connect operation described previously.

My improved assembly provides a reliable fluid-type connection for both pressure and vacuum lines without the requirement for special undercutting machining operations which are required by some quick-connect fittings of known construction.

Figure 2:
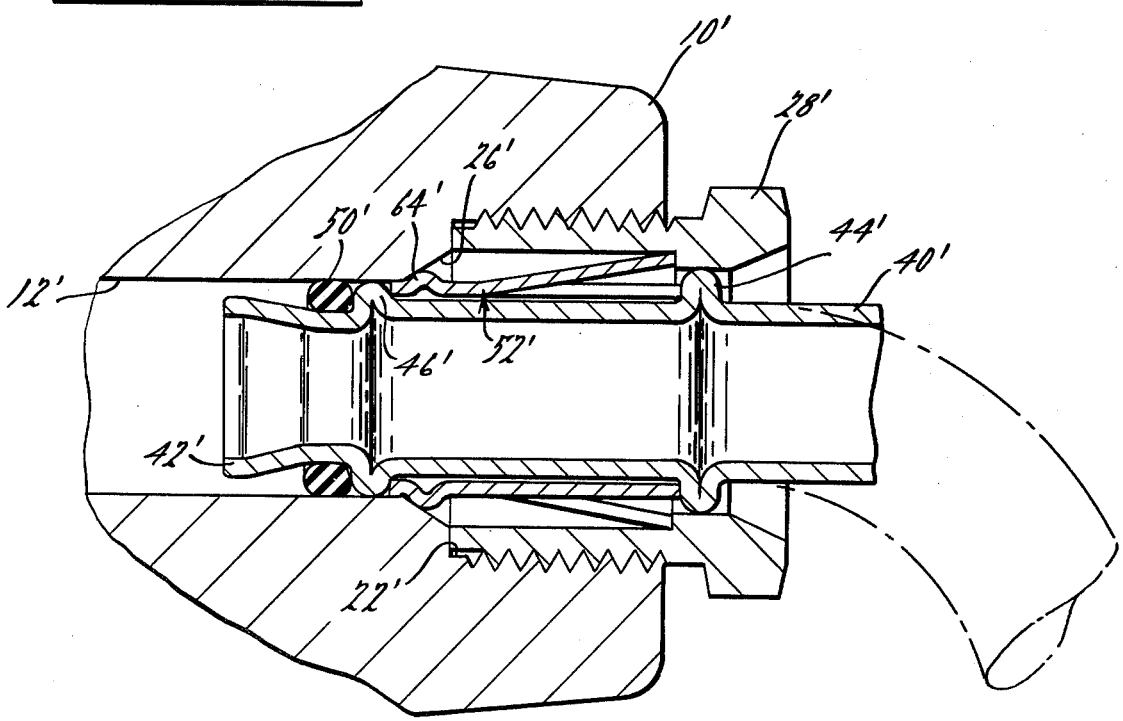
FIG. 2 is an alternate construction similar to the construction of FIG. 1.

Several elements in the embodiment of FIG. 2 are common to the construction of FIG. 1, and these common elements have been identified by similar reference characters although prime notations are added. In the FIG. 2 embodiment, however, the fluid passage 12', which corresponds to the passage 12 of FIG. 1, is not provided with spaced diameter portions 14, 16 and 20. Instead the tapered transition portion 26' is located directly between threaded portion 22' and the interior portion 12'. The end 42' of the tube 40' is received within the interior portion 12' of the passage, but it is not piloted within the passage 12' as is the case in FIG. 1. There is no shoulder in the FIG. 2 construction corresponding to the shoulder 18 of FIG. 1. For this reason the clip 52' is provided with an annular bead 64 at its innermost end, and this defines a shoulder that is adapted to engage the tapered portion 26' when the tube 40 is fully assembled. As in the construction of FIG. 1, the beads 44' and 46' stabilize the tube. During assembly the beads 44 and 44' of the constructions of FIG. 1 and 2 also provide a visual aid so that the assembler can observe when the tube is fully inserted.

The embodiment of FIG. 3 is the same as FIG. 1 except that the groove defined by the reduced diameter portion 48' receives a lip seal 66 rather than an O ring seal as shown at 50. The other elements of the FIG. 3 construction that are common to the elements of FIG. 1 have been identified by similar reference characters although double prime notations are added. Such a lip seal may be of advantage in higher pressure applications. If desired, the lip seal can be complemented by a garter spring 68 as shown in the alternate construction of FIG. 3A. The garter spring is located within the lip portions of the seal 66'. In other respects the lip seal 66 is the same as lip seal 66'.

Having thus described preferred embodiments of my invention, what I claim and desire to secure by U.S. Letters Patent is:

1. A quick connect fitting for a hydraulic tube comprising a nut adapted to be threaded in a threaded opening in a housing, said housing having formed therein a fluid passage communicating with said opening, a central opening formed in said nut, an annular shoulder formed in said central opening, a tube adapted to be inserted within said nut and having formed thereon spaced shoulders, a clip assembled on said tube intermediate said shoulders and having retainer fingers extending radially therefrom, a seal groove formed on one side of one of said shoulders at the innermost end of said tube, a seal in said groove said seal being adapted to sealingly engage the internal surface of said passage in said housing, one of said shoulders on said tube engaging the wall of said passage opening at an inner location and the other engaging the interior of the central opening in said nut thereby stabilizing said tube following assembly.

2. The combination as set forth in claim 1 wherein said housing is formed with a shoulder in said passage at an interior location, said shoulder being engaged by the end of said tube following assembly of said tube.

3. The combination as set forth in claim 1 wherein said clip has formed thereon a shoulder adjacent said one shoulder on said tube, a stop shoulder formed in said housing adjacent said one shoulder on said tube, said stop shoulder being engaged by the shoulder on said clip when said tube is assembled in said passage.

4. The combination as set forth in claim 1 wherein the innermost end of said tube registers with and is piloted on the internal surface of said passage in said housing.

* * * * *